US012138659B2

(12) United States Patent
Pang et al.

(10) Patent No.: US 12,138,659 B2
(45) Date of Patent: Nov. 12, 2024

(54) PLANAR PHASED ULTRASOUND TRANSDUCER ARRAY

(71) Applicant: FUJIFILM SonoSite, Inc., Bothell, WA (US)

(72) Inventors: Guofeng Pang, Ajax (CA); Oleg Ivanytskyy, Toronto (CA); Robert Kolaja, Toronto (CA)

(73) Assignee: FUJIFILM SonoSite, Inc., Bothell, WA (US)

(*) Notice: Subject to any disclaimer, the term of this patent is extended or adjusted under 35 U.S.C. 154(b) by 0 days.

(21) Appl. No.: 18/464,897

(22) Filed: Sep. 11, 2023

(65) Prior Publication Data

US 2023/0415197 A1 Dec. 28, 2023

Related U.S. Application Data

(63) Continuation of application No. 16/687,324, filed on Nov. 18, 2019, now Pat. No. 11,813,640.

(51) Int. Cl.
*B06B 1/06* (2006.01)

(52) U.S. Cl.
CPC ............ *B06B 1/064* (2013.01); *B06B 1/0696* (2013.01)

(58) Field of Classification Search
CPC ......... B06B 1/064; B06B 1/0696; B06B 1/06; B06B 1/0607; B06B 1/0622
USPC ......................................... 310/322, 334, 335
See application file for complete search history.

(56) References Cited

U.S. PATENT DOCUMENTS

| | | | | |
|---|---|---|---|---|
| 8,316,518 | B2 | 11/2012 | Likacs et al. | |
| 8,823,246 | B2 | 9/2014 | Brown et al. | |
| 11,813,640 | B2 | 11/2023 | Pang et al. | |
| 2007/0222339 | A1* | 9/2007 | Lukacs | B06B 1/0622 310/334 |
| 2008/0238262 | A1* | 10/2008 | Takeuchi | B06B 1/0622 310/346 |
| 2013/0140955 | A1* | 6/2013 | Chaggares | H10N 30/063 310/334 |
| 2014/0144192 | A1 | 5/2014 | Derman | |
| 2019/0200959 | A1 | 7/2019 | Chaggares et al. | |
| 2019/0366384 | A1 | 12/2019 | Pang et al. | |

OTHER PUBLICATIONS

"Final Office Action", U.S. Appl. No. 16/687,324, filed May 5, 2023, 8 pages.
"Non-Final Office Action", U.S. Appl. No. 16/687,324, filed Sep. 14, 2022, 7 pages.
"Notice of Allowance", U.S. Appl. No. 16/687,324, filed Jul. 18, 2023, 7 pages.

* cited by examiner

*Primary Examiner* — Derek J Rosenau
(74) *Attorney, Agent, or Firm* — Colby Nipper PLLC

(57) ABSTRACT

Planar phased ultrasound transducer including a first layer including a sheet of piezoelectric material, a piezo frame surrounding an outer perimeter of the sheet of piezoelectric material, and an epoxy material placed between the piezo frame and the sheet of piezoelectric material. The transducer includes a flex frame secured to a back side of the first layer.

20 Claims, 16 Drawing Sheets

Coat Gold Ground Electrode

Fill VIAs with Silver Epoxy

Apply Matching Layers/Lens

Apply Matching Layers
FIG. 2F1
Apply Lens Frame
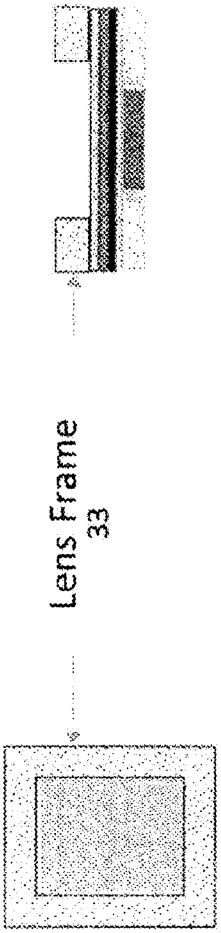
FIG. 2F2
Attach Lens
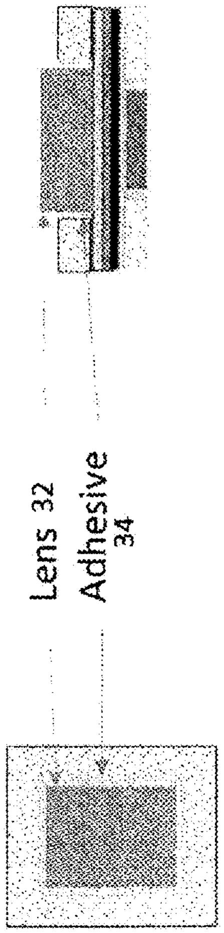
FIG. 2F3

Lap Lens/Frame Flat
FIG. 2F4

Lens Curvature Machining

Cross Sectional View of Lens Honing
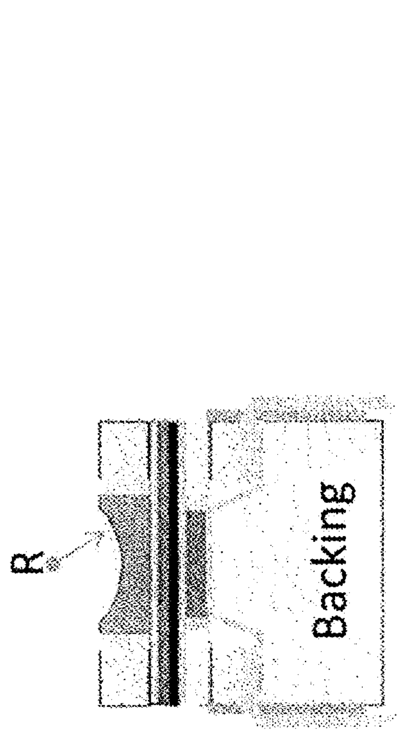
FIG. 2Q1
Cross Sectional View of A Complete Stack
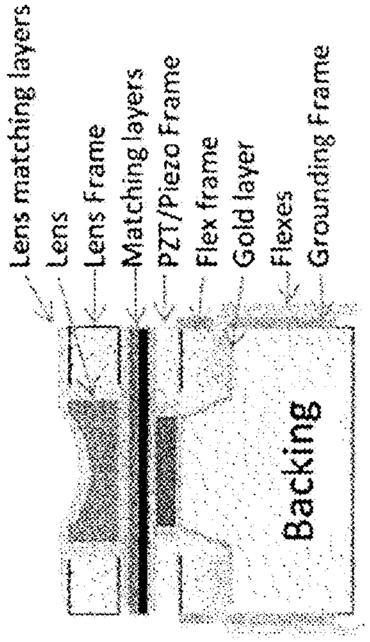
FIG. 2Q2

PLANAR PHASED ULTRASOUND TRANSDUCER ARRAY

CROSS-REFERENCE TO RELATED APPLICATION(S)

This application is a continuation of and claims priority to U.S. Non-Provisional patent application Ser. No. 16/687,324, filed on Nov. 18, 2019, the disclosure of which is incorporated by reference herein in its entirety.

TECHNICAL FIELD

The disclosed subject matter is directed to phased array ultrasound transducers, and in particular planar high frequency phased array ultrasound transducers.

BACKGROUND

Most modern ultrasound imaging systems work by creating acoustic signals from a number of individual transducer elements that are formed in a sheet of piezoelectric material. By applying a voltage pulse across an element, the element is physically deformed thereby causing a corresponding ultrasound signal to be generated. The signal travels into a region of interest where a portion of the signal is reflected back to the transducer as an echo signal. When an echo signal impinges upon a transducer element, the element is vibrated causing a corresponding voltage to be created that is detected as an electronic signal. Electronic signals from multiple transducer elements are combined and analyzed to determine characteristics of the combined signal such as its amplitude, frequency, phase shift, power and the like. The characteristics are quantified and converted into pixel data that can be used to create an image of the region of interest.

A phased array transducer works by selectively exciting more than one element in the array at a time so that a summed wave front is detected in a desired direction. By carefully changing the phase (e.g., time delay) and in some cases, the amplitude of the signals produced by each transducer element, a combined beam can be directed over a range of angles in order to view areas other than those directly ahead of the transducer. For a phased array transducer to work well, the pitch of the individual transducer elements is generally required to be about ½ of the wavelength of the center frequency of the transducer or less. While low frequency, phased array transducers (e.g., 2-10 MHz) have been used for some time, high frequency phased array transducers have been difficult to manufacture due to the small size of the transducer elements and the higher attenuation of high frequency ultrasound signals. For example, for a 20 MHz phased array, the active area can be only 3 mm×5 mm By comparison, for a 20 MHz linear array, the active area can be 3 mm×24 mm.

The smaller geometry of a high frequency phased array can make it difficult to assemble, particularly with a tapered support. Parts and assembly tools have to be miniaturized to adapt to the small geometry. Accordingly, there is a need for a high frequency phased array that can be easier to build and/or assembled.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter is directed to a planar phased ultrasound transducer. The ultrasound transducer includes a first layer including a sheet of piezoelectric material, a piezo frame surrounding an outer perimeter of the sheet of piezoelectric material, and an adhesive material placed between the piezo frame and the sheet of piezoelectric material. The ultrasound transducer also includes a flex frame secured to a back side of the first layer.

In accordance with the disclosed subject matter, the sheet of piezoelectric material can include a number of kerf cuts therein to define a number of individual transducer elements. The piezo frame can include alumina. The piezo frame can include first and second vias, each via having silver epoxy disposed therein. The flex frame can include alumina.

In accordance with the disclosed subject matter, the ultrasound transducer can include a conductive grounding layer secured to a front side of the first layer. The ultrasound transducer can include at least one matching layer secured to the conductive grounding layer. The ultrasound transducer can include a lens secured to the at least one matching layer.

In accordance with another aspect of the disclosed subject matter, the ultrasound transducer can include a first pair of alignment features secured to a first side of the flex frame and a second pair of alignment features coupled to a second side of the flex frame. The ultrasound transducer can include a first flex circuit secured to the first pair of alignment features and a second flex circuit coupled to the second pair of alignment features, each flex circuit comprising copper traces. The ultrasound transducer can include a flex overmold secured to the first and second flex circuits, the first and second pairs of alignment features, the flex frame, and the back side of the first layer, wherein the copper traces of the first and second flex circuits are exposed through the flex overmold. Furthermore, the ultrasound transducer can include a plurality of conductive electrodes secured to the flex overmold and each coupled to at least one copper trace of the first and second flex circuits. The ultrasound transducer can include a backing fixed to the flex frame.

In accordance with another aspect of the disclosed subject matter, a method of manufacturing a planar phased ultrasound transducer is provided. The method includes forming a first layer including a sheet of piezoelectric material, a piezo frame surrounding an outer perimeter of the sheet of piezoelectric material and having at least two ground vias, and an adhesive material placed between the piezo frame and the sheet of piezoelectric material. The method further includes securing a flex frame to a back side of the first layer.

In accordance with the disclosed subject matter, the method can include cutting a plurality of kerfs in the piezoelectric material and filling the kerfs with an epoxy or elastomeric material. The method can include coating a front side of the first layer with a gold ground electrode. The at least two ground vias can be filled with a conductive adhesive such as silver epoxy. The method can include securing at least one matching layer to the gold ground electrode. A lens can be secured to the at least one matching layer.

In accordance with the disclosed subject matter the method can include securing a first pair of alignment features to a first side of the flex frame and a second pair of alignment features to a second side of the flex frame. The method can further include securing a first flex circuit to the first pair of alignment features and a second flex circuit to the second pair of alignment features, each flex circuit comprising copper traces. The method can include securing a flex overmold to the first and second flex circuits, the first and second pairs of alignment features, the flex frame, and the back side of the first layer and exposing the copper traces using a laser. The method can include disposing a gold electrode layer on the overmold, and separating, using a laser, the gold electrode layer into a plurality of conductive electrodes secured to the flex overmold and each coupled to at least one copper trace of the first and second flex circuits. The method can include applying a backing preform.

DETAILED DESCRIPTION

Reference will now be made in detail to the various exemplary embodiments of the disclosed subject matter, exemplary embodiments of which are illustrated in the accompanying drawings. The disclosed technology relates to planar phased ultrasound arrays, and in particular planar high frequency phased ultrasound array. As described herein, planar high frequency phased ultrasound array(s) can be referred to generally as "ultrasound array(s)" or "array(s)" (unless otherwise noted). Ultrasound arrays can include a plurality of layers, which can collectively be referred to as a "stack." The ultrasound arrays as disclosed herein, can be built layer by layer to achieve the designed structures. As additional layers are added to form a stack, a "front side" of the stack or a specific layer refers to a side that faces toward a region of interest and a "back side" of the stack or a specific layer refers to a side that faces proximally toward the ultrasound operator in a finished transducer. The layers can be parallel to each other and can be rectangular cuboids. That is, a layer can have six faces that each define a rectangle and which are placed at right angles. The parts can use a planar form and the required manufacturing tools can be designed for the assembly of planar structures. As used in the description and the appended claims, the singular forms, such as "a," "an," "the," and singular nouns, are intended to include the plural forms as well, unless the context clearly indicates otherwise.

The planar high frequency phased ultrasound arrays as described herein can have improved stability and rigidity due to the planar shape and additional ceramic frames included in various layers, as described herein below. For example, the arrays can maintain geometric accuracy (for small spacing) and mechanical rigidity, and thermal expansion can be minimal (e.g., during manufacturing). Furthermore, the planar design of the arrays disclosed herein can be manufactured more easily and with fewer specialized tools, at least due to the shape of the stack during the manufacturing process.

Figure 1:
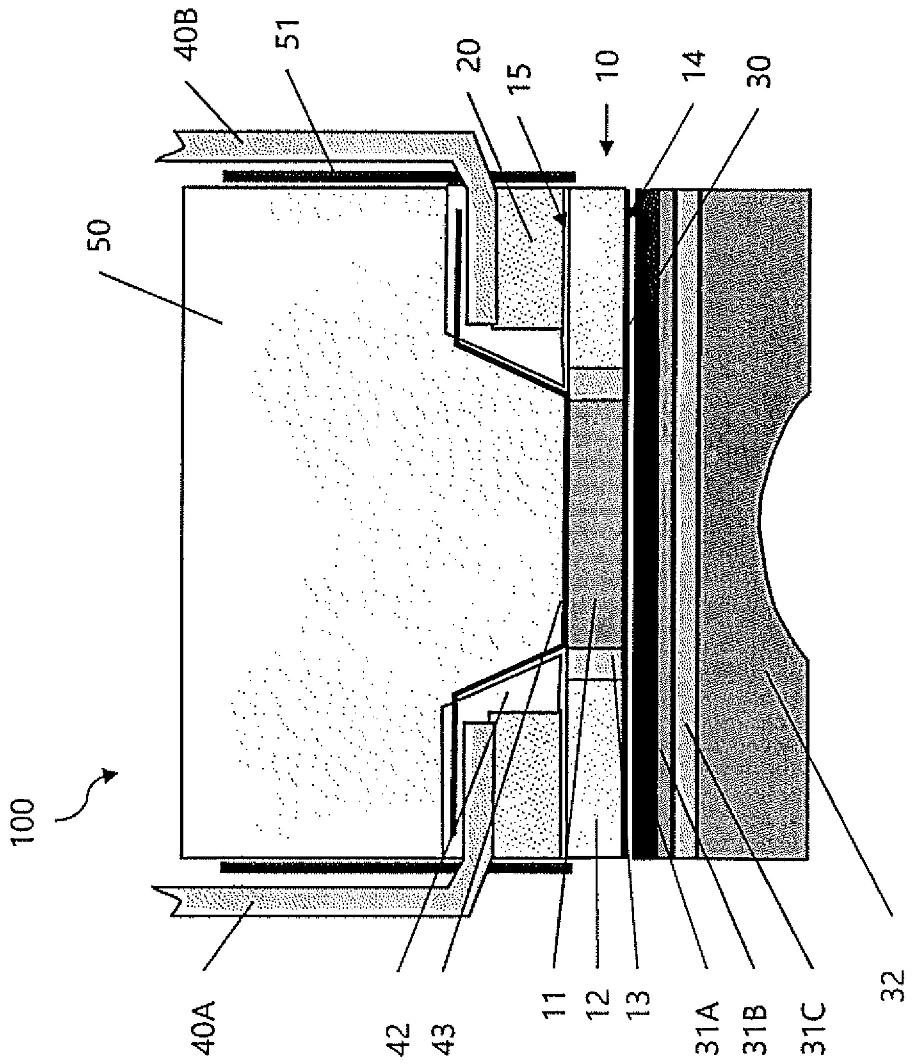
FIG. 1 provides a cross-section view of a planar high frequency phased ultrasound array in accordance with the disclosed subject matter.

In accordance with the disclosed subject matter, and with reference to FIG. 1 for purpose of illustration and not limitation, a planar high frequency phased ultrasound array 100 is provided. Ultrasound array 100 can include a first layer 10. First layer 10 can include a sheet of piezoelectric material 11, a piezo frame 12 surrounding an outer perimeter of the sheet of piezoelectric material 11, and an epoxy material 13 placed between the piezo frame 12 and the sheet of piezoelectric material 11. The first layer 10 includes a front side 14 and a back side 15. The ultrasound array 100 can further include a flex frame 20 secured to a back side 15 of the first layer 10. For example, the flex frame 20 can be glued to the back side 15 of the first layer 10. The flex frame 20 can be flat in shape (i.e., not tapered). For example, the flex frame 20 can be generally a rectangular cuboid in shape with cut-out regions corresponding to the vias of the first layer two opposite faces and a cut-out region extending between two other opposite faces.

A conductive grounding layer 30 can be secured to the front side 14 of the first layer 10. At least one matching layer 31 can be secured to the conductive grounding layer 30. For example, and as shown in FIG. 1, three matching layers 31A, 31B, 31C, can be secured in series. A lens 32 can be secured to the at least one matching layer 31. As illustrated in FIG. 1, the lens 32 can be secured to matching layer 31C.

The ultrasound array 100 can also include flexible circuits (also referred to as "flexes") 40A, 40B. The flexes 40A, 40B can be coupled to the flex frame 20, using alignment features 44, described in greater detail below. In some embodiments, the alignment features 44 can be alignment tabs. A flex overmold 42 can be provided. The flexes 40A, 40B can include copper traces, and the copper traces of the flexes 40A, 40B can be coupled to the sheet of piezoelectric material 11 by conductive traces, such as gold traces 43, which can extend through the flex overmold 42. The ultrasound array 100 can also include a backing 50 fixed to the flex frame 20, and a ground frame 51 to connect grounding elements.

Figures 2A, 2B, 2C:
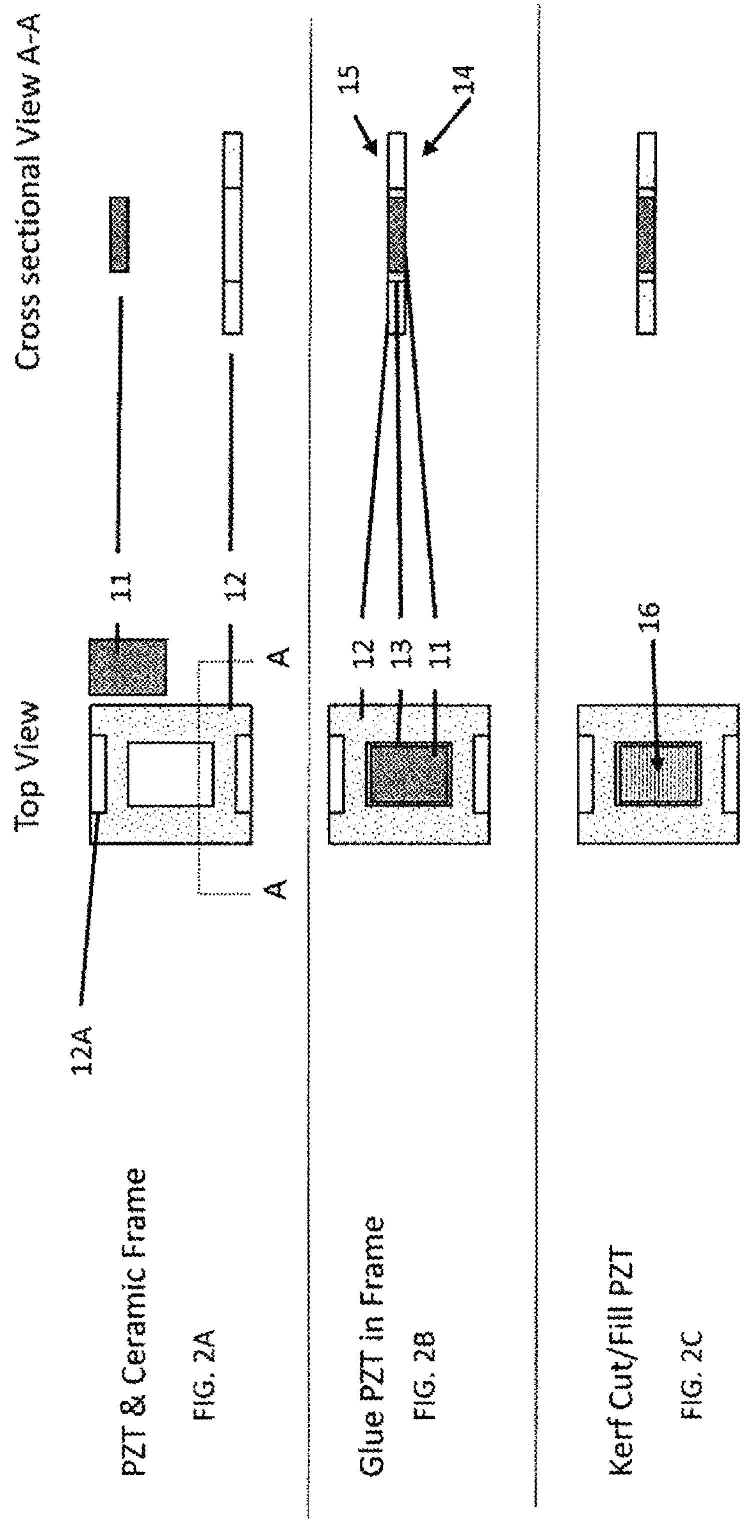
FIGS. 2A-2Q2 illustrate the process for manufacturing a planar high frequency phased ultrasound array in accordance with the disclosed subject matter.
Figure 2D:
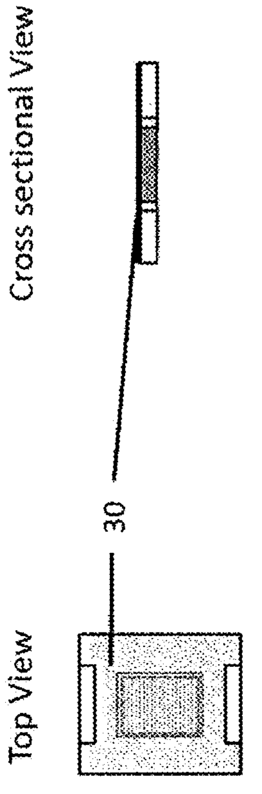
Figure 2E:
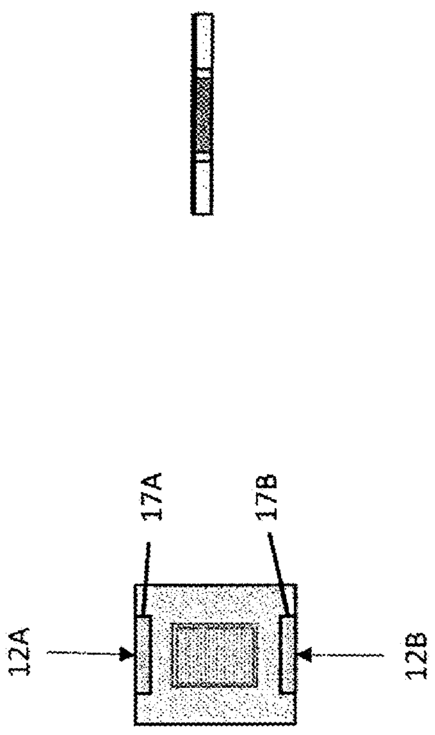
Figure 2F:
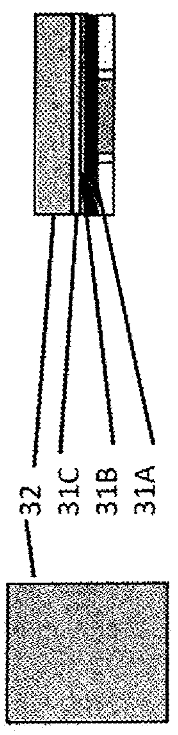
Figures 2G, 2H, 2I:
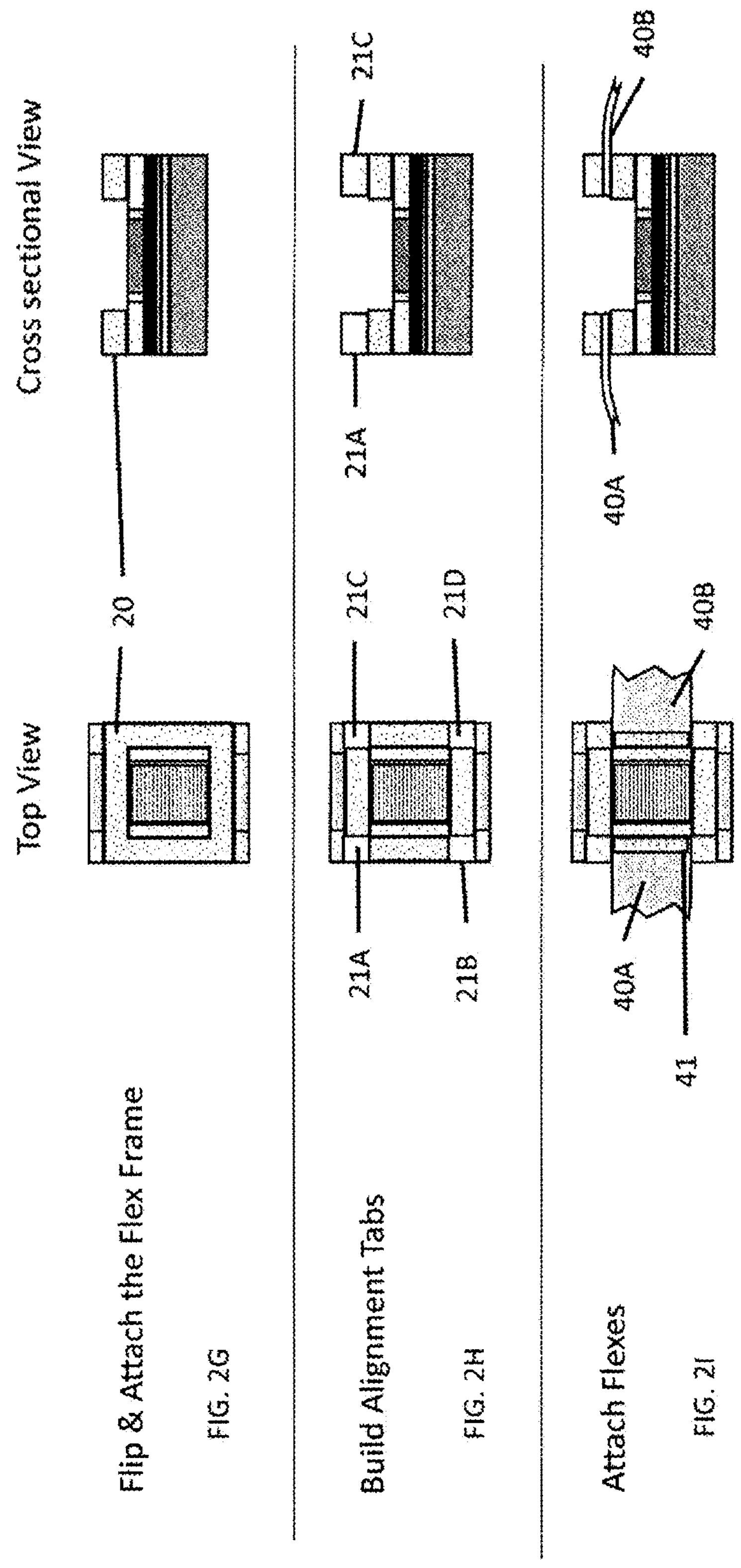
Figures 2J, 2K, 2L:
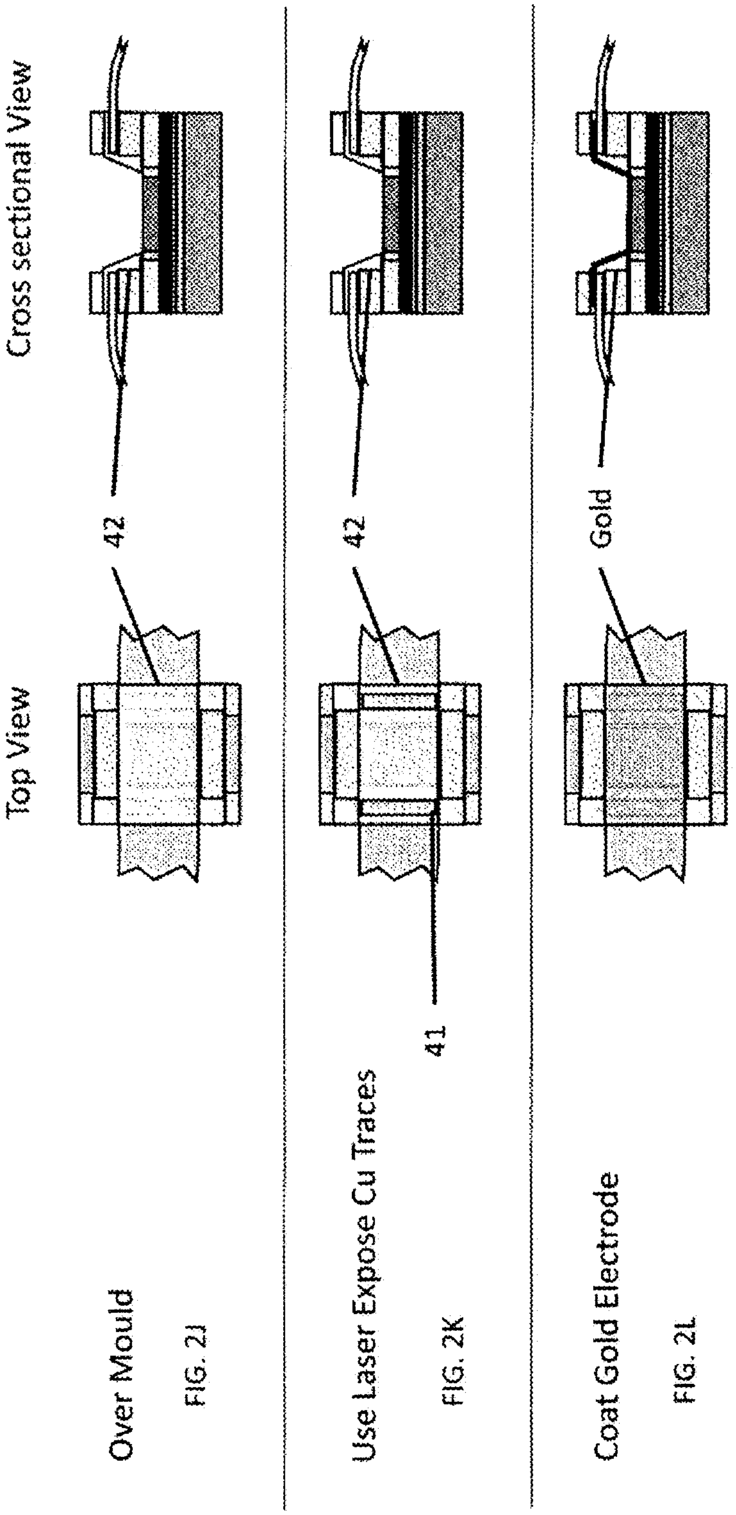
Figures 2M, 2N, 2O:
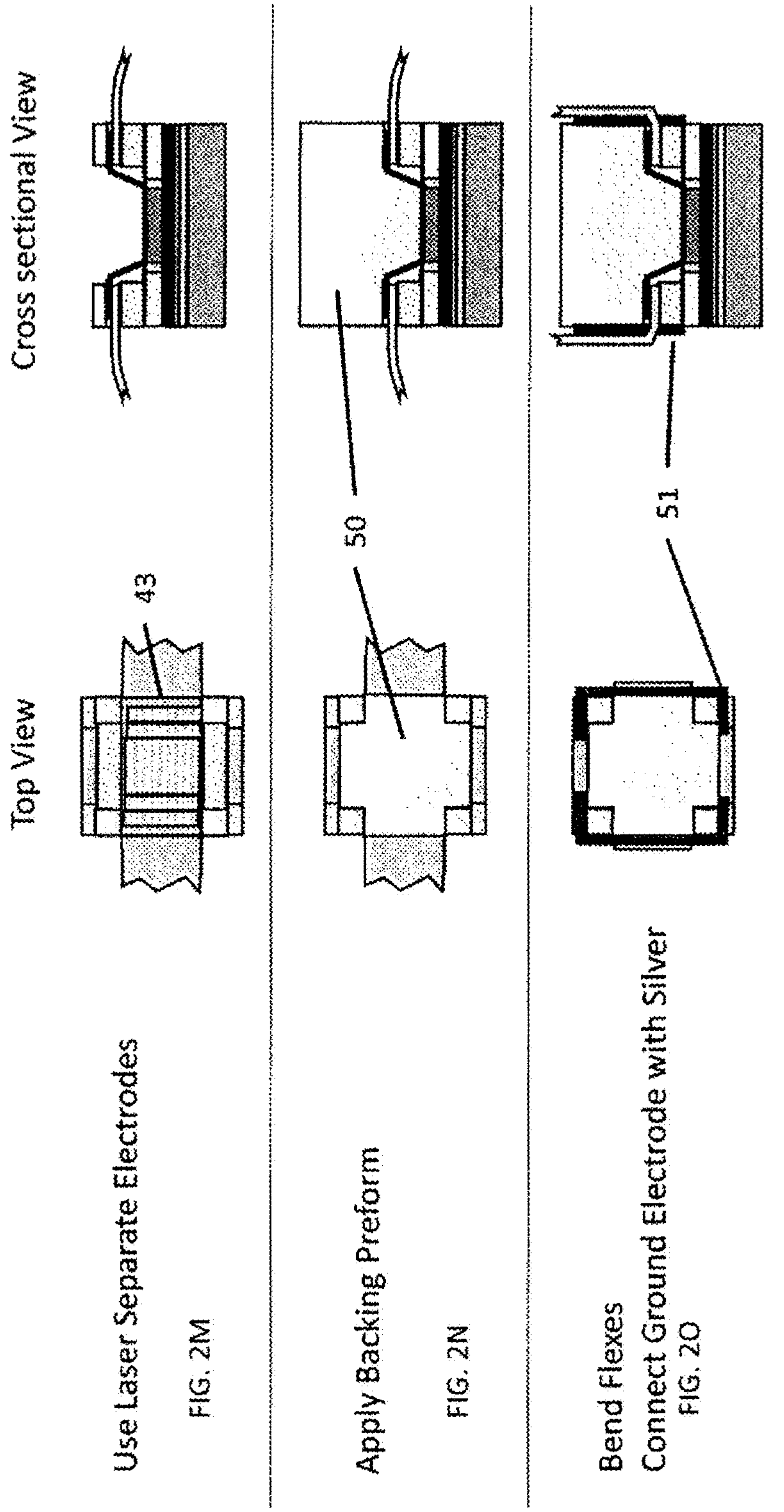
Figure 2P:
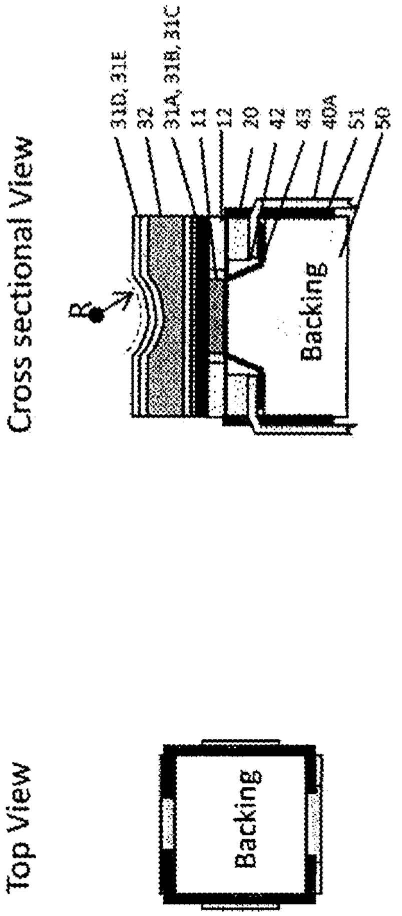

FIGS. 2A-2P illustrate, for purpose of illustration and not limitation, individual elements of ultrasound array 100 in greater detail, and set forth a method for manufacturing ultrasound array 100. For example, and with reference to FIGS. 2A-2B, first layer 10 includes a sheet of piezoelectric material 11, which can be cut to a precise size, for example, 6.2 mm×3.0 mm. In accordance with the disclosed subject matter, the piezoelectric material 11 can be made from lead zirconate titanate, commonly known as PZT. For the remainder of the description, "PM" will be used to refer to the piezoelectric material. It is understood that other materials, such as single crystal ferroelectric relaxors (e.g., PMN-PT) or synthetic piezoelectric materials can be used as the PM. The PM material 11 can be surrounded by piezo frame 12. The piezo frame can be a non-conductive material having a coefficient of thermal expansion ("CTE") that is similar to the CTE of the sheet of piezoelectric material. The piezo frame 12 can be, for example, a pre-machined alumina plate. Alumina has a CTE of about 7.2 microns/m° C. where the CTE for PZT is approximately 4.7 microns/m° C. However, other materials with a coefficient of thermal expansion similar to the PM could be used, such as molybdenum or fine grain isotropic graphite. As used herein, coefficients of thermal expansion are similar if the PM in the frame doesn't crack due to thermal stresses when operated and handled over its normal temperature operating range. The piezo frame 12 can include ground vias (also called "ground slots") 12A, 12B on each side. With this structure, a pure 1-3 composite can be made and used in the transducer.

The PZT material 11 can then be glued into the frame 12 using an insulating material, such as epoxy material 13. The epoxy material 13 can be from the EPO-TEK family available from Epoxy Technology, Inc., Billerica MA and can be doped with hafnium oxide or ceramic particles. The particles can be added to the epoxy to resist shrinkage and to resist laser machining. As shown in FIG. 2B, the epoxy material 13 can be molded around the sides of the sheet of piezoelectric material 11 and can be flush with the sheet of PM 11 to form the first layer 10 having the front side 14 and back side 15. As described above, the front side 14 of the layer 10 faces toward the region of interest and the back side 15 of the layer 10 faces proximally toward the ultrasound operator in a finished transducer. Once the epoxy material 13 is cured, the front side 14 and the back side 15 can be lapped, ground or otherwise made flat to remove any extra epoxy and to provide flat references for a number of additional machining steps as set forth below.

Kerf cuts 16 can be created in the PM 11. The kerf cuts 16 can be made with an excimer or other patterning laser. An excimer laser can cut a 6-micron kerf to a depth of ~85-90 microns in piezo ceramics. The average effective kerf width can be about 3-5 microns. A back cut can also be performed with the laser to maintain the uniformity of the kerf width along the vertical structure. As shown in FIG. 2C, for example, kerf cuts 16 can be cut across the entire width of the PM 11 from one edge to the other. The entire piezo sheet can be cut to form transducer elements. Because the epoxy material 13 is softer than the PM, the transducer elements can be effectively floating in the cured epoxy material 13. The kerf cuts that define individual transducer elements can begin in the epoxy material 13 on one side of the frame and continue across the entire width of the PM 11 to the epoxy material 13 on the other side of the PM 11.

The kerf cuts can be placed at a desired pitch and to a depth sufficient to form the transducer element, depending on the desired center frequency of the transducer being manufactured. In accordance with the disclosed subject matter, a transducer element can comprise two electrically connected sub-elements that can be separated by a sub-dice kerf cut that extends across the entire width of the PM 11. The sub-dice kerfs can be cut in the middle of each element to maintain the desired aspect ratio between width and thickness. The sub-dice kerf cuts can have the same depth as the kerf cuts that define individual transducer element, or the sub-dice kerf cuts can be cut to a shallower depth than the primary kerfs such that they do no extend all the way through the final thickness of the PM 11. It is understood that sub-dice kerf cuts are optional.

Figure 3:
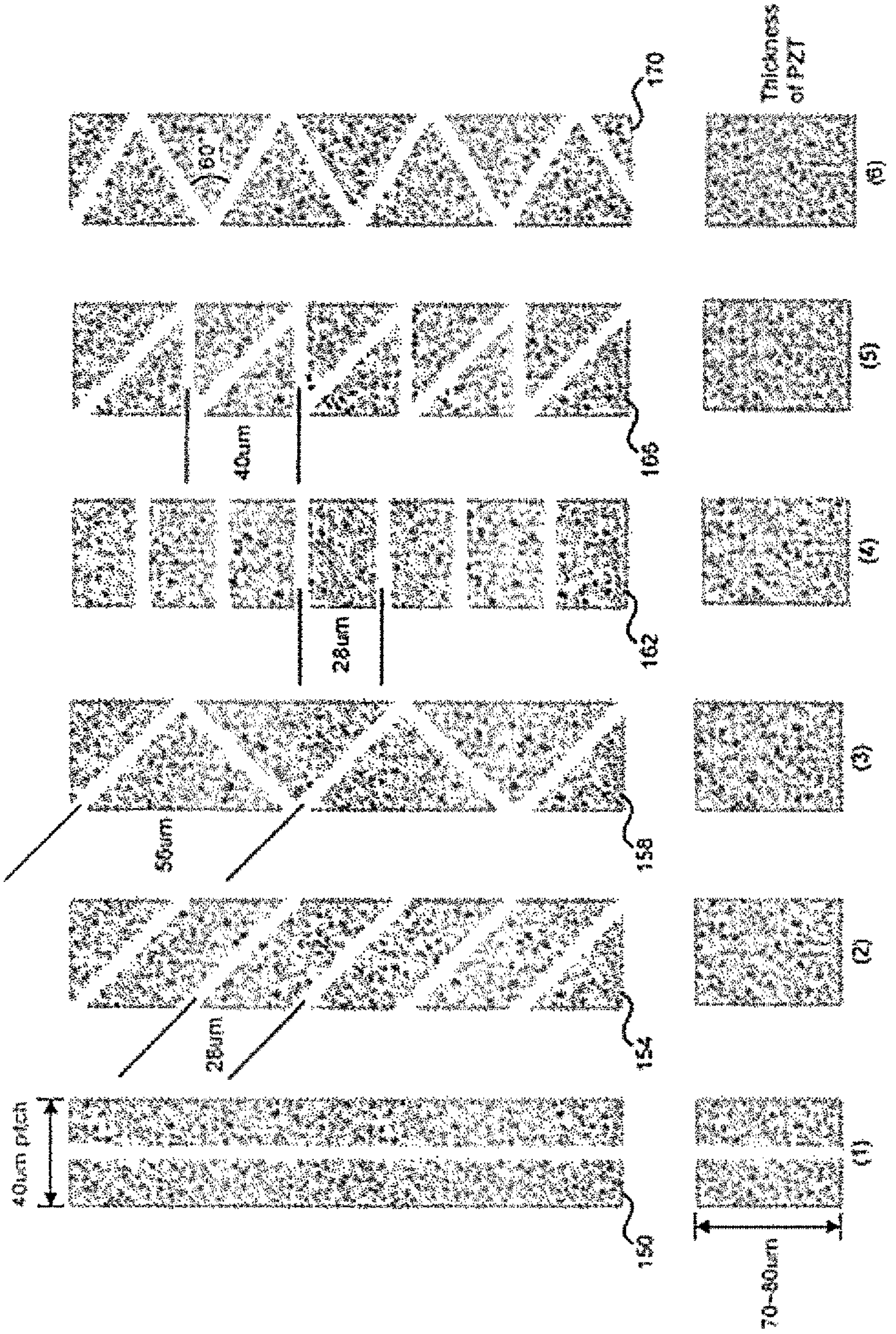
FIG. 3 shows a number of alternative sub-dice kerf cut patterns for a piezoelectric layer in accordance with the disclosed subject matter.

Additional kerf cuts can be laser machined into the piezo layer with those defining the individual transducer elements. FIG. 3 illustrates a number of possible sub-dicing patterns. A pattern 150 is a conventional sub-dice pattern where a transducer element is divided lengthwise down its center by a single sub-dice kerf cut. This sub-dice kerf cut has the same length as the transducer element. As will be appreciated by those skilled in the art, the width/height ratio of a transducer element should be less than or equal to the "golden ratio" of about 0.6 to minimize lateral vibrational modes in the PM. In some embodiments of the disclosed technology, an excimer UV laser can cut a kerf line of approximately 6 um in width. At a 40 micron element pitch and 70-80 micron PM thickness, this ratio can be met without using a center sub-dice kerf cut.

Other sub-dice patterns may be useful for certain transducer applications. A pattern 154 includes a number of parallel sub-dice kerf cuts that are cut at an acute angle (e.g. about 45 degrees) with respect to the kerf cuts that define the transducer elements. In the embodiment shown, the parallel sub-dice kerf cuts are spaced 28 microns apart for a 40 micron wide transducer element but other spacings could be used. By taking kerf width into account, the golden ratio can be well maintained, and the pattern can preserve active PM in the structure and can improve the sensitivity of the array.

A third sub-dice pattern 158 is formed by alternating sets of differently angled parallel cuts that are cut at angles (e.g. 45 and 135 degrees) with respect to the direction of the kerf cuts that define the transducer elements. The result is a set of alternately oriented, triangular piezo pillars each having a base that is aligned with a kerf cut defining the transducer element and a height that is the width of the transducer element. In the embodiment shown, each such triangle has a base that is 56 microns long and a height of 40 microns (less the kerf widths) for a transducer with elements at a 40 micron pitch. Triangle patterns can reduce the lateral mode and maintain the PM resonating in a bar mode. The patterns can improve the sensitivity and bandwidth of the array. The triangle pattern 158 can keep more active PM in the structure than, for example, triangle pattern 170.

A fourth pattern 162 is made with sub-dice kerfs cuts that are perpendicular to the kerf cuts that define the transducer elements. In this pattern, a number of rectangular piezo pillars are formed with a height of, for example, 28 microns and width equal to the width of the transducer elements (e.g. 40 microns in the embodiment shown). This rectangular pattern can keep more active PM in the structure than, for example, patterns 154 and 158.

A fifth pattern 166 is made with sub-dice kerf cuts that are formed by a plurality of parallel cut kerf cuts oriented at an acute angle (e.g. 45 degrees) with respect to the kerf cuts defining the individual transducer elements and that are interspaced with kerf cuts that are perpendicular to the kerf cuts that define the individual transducer elements. This pattern forms a number of alternating right triangles with their hypotenuses facing each other in the transducer element. In the embodiment shown, the legs of the right triangles are 40 microns long.

A sixth pattern 170 of kerf cuts forms a number of alternately oriented equilateral triangles in the transducer element by forming kerf cuts at 60 and 120 degrees with respect to the kerf cuts that define the individual transducer elements.

After the kerf cuts that define the transducer elements and the sub-dice elements (if used) are fashioned by the laser, the kerf cuts can be filled with an epoxy material. The epoxy material used to fill in the kerf cuts can be a doped flexible EPO-TEK 301 epoxy.

After the epoxy in the kerf cuts 16 has cured, the front side 14 of the first layer 10 can be lapped, ground or otherwise made flat. As shown in FIG. 2D, for example, a grounding layer 30 of a conductive metal, such as gold or gold and an adhering metal, such as chromium, can be applied to the front side 14 of the first layer 10 by sputtering or similar technique. As shown in FIG. 2E, for example, the vias 12A, 12B can be filled with a silver epoxy 17A, 17B.

One or more matching layers and a lens can be applied to the conductive grounding layer 30. The number of matching layers can depend on the mismatch between the acoustic impedance of the PM and the acoustic impedance of the lens material. In the illustrated embodiment (FIG. 2F), three matching layers 31A, 31B, 31C are used. In accordance with the disclosed subject matter, each of the matching layers can be an epoxy material that is doped with powders to alter its acoustic performance in order to achieve a required transducer performance. For example, matching layer 31A can be applied over the conductive grounding layer 30 and can include a layer of EPO-TEK 301 epoxy doped with tungsten powder. Matching layer 31B can be applied over the surface of matching layer 31A and can include a layer of EPO-TEK 301 epoxy doped with tungsten powder and silicon carbide (SiC) nanoparticles. Matching layer 31C can be applied over the surface of matching layer 31B and can include a layer of EPO-TEK 301 epoxy doped with silicon carbide (SiC) nanoparticles. In certain embodiments, the matching layer 31C can include titanium dioxide and/or hafnium dioxide, among other suitable materials.

Each of the matching layers can have a thickness that is preferably an odd multiple of a ¼ wavelength at the operating center frequency of the transducer. Most often, the thicknesses can be one of 1, 3, 5 or 7 quarter wavelengths thick. However, this can vary depending on the desired acoustic properties of the transducer. It will be appreciated that these matching layers are merely exemplary and that other matching layer compositions can be used depending on the desired operating frequency of the transducer, the lens material to be used, etc. The details of how matching layers can be doped with particles to achieve a desired acoustic impedance are considered to be known to those of ordinary skill in the art of ultrasound transducer design. Properly selected matching layers and the lens can bring the ultrasound wave all the way to the top of the stack before the ultrasound wave spreads at the desired angles.

After each matching layer is applied and cured, the front face of the stack can be lapped to achieve a desired thickness and to keep the front surface flat. In phased arrays, the matching layers and the lens can act as a wave guide. Accordingly, it can be beneficial to keep the same kerf cut pattern in the matching layers and the lens. Kerf cuts can be cut in the cured matching layers with a laser to align with both the kerf cuts 16 that define the individual transducer elements and the sub-dicing kerf cuts (if used). Alternatively, kerf cuts can be made in the matching layers to align with only the kerf cuts 16 that define the individual transducer elements and not over the sub-dice kerf cuts. The kerf cuts can extend through the matching layers 31A, 31B, 31C and can extend partially or fully through the grounding layer 30 with no loss of connectivity between the grounding layer and the transducer elements. Once created, the kerf cuts in the matching layers can be filled with the same filled epoxy material that fills the kerf cuts in the PM. It is understood that kerf cuts in the matching layers are optional.

Figure 4:
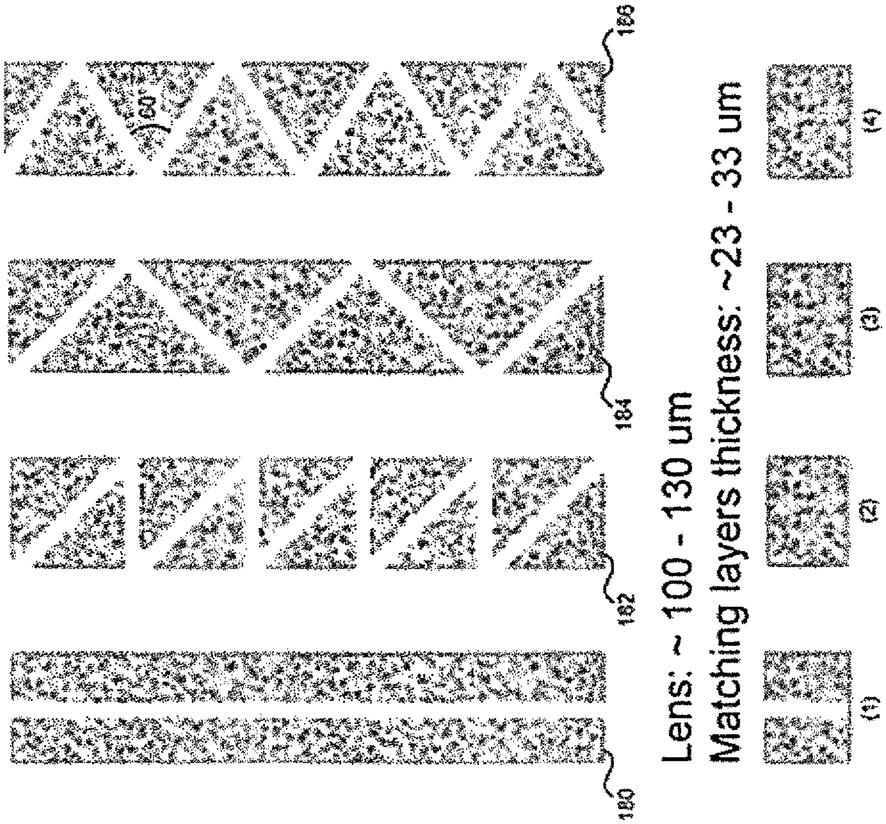
FIG. 4 shows a number of alternative sub-dice kerf cut patterns for a number of matching layers in accordance with the disclosed subject matter.

FIG. 4 shows a number of possible sub-dice kerf cuts that can be formed in the matching layers and the lens to correspond to the sub-dice kerf cuts in the piezo layer.

A pattern 180 corresponds to the pattern 150 with a single kerf cut defining a pair of sub-diced elements. A pattern 182 corresponds to the right triangular pattern 166. A pattern 184 corresponds to the alternating triangular pattern 158, while a pattern 186 corresponds to the alternating equilateral triangle pattern 170.

After each matching layer is applied, cured, kerf cut, filled, and lapped (if necessary), and with reference to FIGS. 2F, 2F1, 2F2, 2F3, and 2F4 for purpose of illustration and not limitation, the lens 32 can be bonded to the matching layers. In particular embodiments, kerf cuts can be formed in the lens 32 and can be aligned with kerf cuts in the matching layers. The kerf cuts can be aligned with both the PM kerf cuts and sub-dice kerf cuts. Alternatively, the kerf cuts can be aligned with only the PM kerf cuts. The same material used for the uppermost matching layer 31C can be used to glue the lens 32 to the stack. The lens 32 can be polymethylpentene (sold under the tradename TPX), or celezole or cross-linked polystyrene (sold under the tradename Rexolite) or a combination of the listed materials. In particular embodiments, a lens frame 33, as shown in FIG. 5D, can surround the lens.

FIG. 2F1 shows, for purposes of illustration and not limitation, the application of the matching layers. FIG. 2F2 shows, for purposes of illustration and not limitation, the application of the lens frame 33 with the matching layers. FIG. 2F3 shows, for purposes of illustration and not limitation, the attachment of the lens 32 with glue or adhesive, as detailed above. FIG. 2F4 shows, for purposes of illustration and not limitation, a flattening of the lens frame 33 and the lens 32 such that an uppermost surface of each the lens frame 33 and the lens 32 are in the same plane.

With reference to FIGS. 2G-2O, for purpose of illustration and not limitation, after the lens 32 is bonded to the transducer stack, the stack can be flipped and the back side of the stack can be manufactured. For example, the back side 15 of the first layer 10 can be lapped to a desired thickness depending on the desired operating frequency of the transducer. The flex frame 20 can be coupled to the back side 15 of the first layer (FIG. 2G). The flex frame 20 can be the same material as the piezo frame 12, for example, alumina. The flex frame 20 can have a different shape than the piezo frame 12.

As shown in FIGS. 2H-2I, for purpose of illustration and not limitation, alignment features 21A-21D, can be coupled to the back side of the flex frame 20. In certain embodiments, the alignment features 21A-21D can be alignment tabs. A flex locator mold tool (not shown) can be used to shape the alignment features 21A-21D. The alignment features 21A-21D can be machined to a desired size and shape. The alignment features 21A-21D can form two pairs of alignment features including a first pair of alignment features 21A, 21B on a first side of the flex frame 20 and a second pair of alignment features 21C, 21D on a second side of the flex frame 20. The alignment features 21A-21D are configured to receive flexes 40A, 40B. The flexes 40A, 40B can have traces, for example copper traces 41, that can deliver electrical signals to and from the transducer elements. In accordance with the disclosed subject matter, the first flex 40A can have traces 41 connected to all even numbered transducer elements and the second flex 40B on an opposite side of the flex frame 20 can have traces 41 connected to all odd numbered transducer elements. Alternatively, a single flex can include traces for both the even and odd transducer elements.

A flex overmold 42 can be coupled to the back side of the stack, as shown in FIG. 2J. The flex overmold 42 can be coupled to one or more of the first and second flexes 40B, the alignment features 21A-21D, the flex frame 20, and the back side 15 of the first layer 10. As shown in FIG. 2K, a laser can be used to expose, though the flex overmold 42, the copper traces 41 of the flexes 40A, 40B. A central portion of the flex overmold 42 can also be removed.

Once the flex overmold 42 has been connected, conductive pathways can be formed between the transducer elements and the flex circuits 40A, 40B. For example, and as shown in FIGS. 2L-2M, a conductive layer, for example a gold conductive layer, can be coated on the back side of the stack, and a laser can be used to separate the layer into gold traces 43. Connections between transducer elements and the metal signal traces in the flex circuits can be made using the techniques described in U.S. Patent Publication No. 2014/0144192 and/or U.S. Pat. No. 8,316,518, which are each incorporated by reference herein in their entireties.

Once the connections have been made between the transducer elements and the traces in the flex circuits, a backing layer 50 can be secured to the assembly behind the transducer elements (FIG. 2N). A grounding frame 51 can be coupled to the backing element and the flexes can be bent around the frame 51 (FIG. 20). The grounding frame 51 can be coupled to the silver epoxy 17A, 17B in vias 12A, 12*b*.

The ultrasound beam can be focused to a certain depth of the imaging field. In some embodiments, a curvature can be created in the lens and any additional matching layers on top of the lens. After coupling the backing 50 and grounding frame 51, the stack can be held in a fixture and the lens can be machined. One or more matching layers 31D, 31E can be molded on top of the lens, or finished by the lens machining technique.

FIG. 2Q1 shows, for purposes of illustration and not limitation, a cross-sectional view of lens machining FIG. 2Q2 shows, for purposes of illustration and not limitation, a cross-sectional view of a complete stack.

Figure 5A:
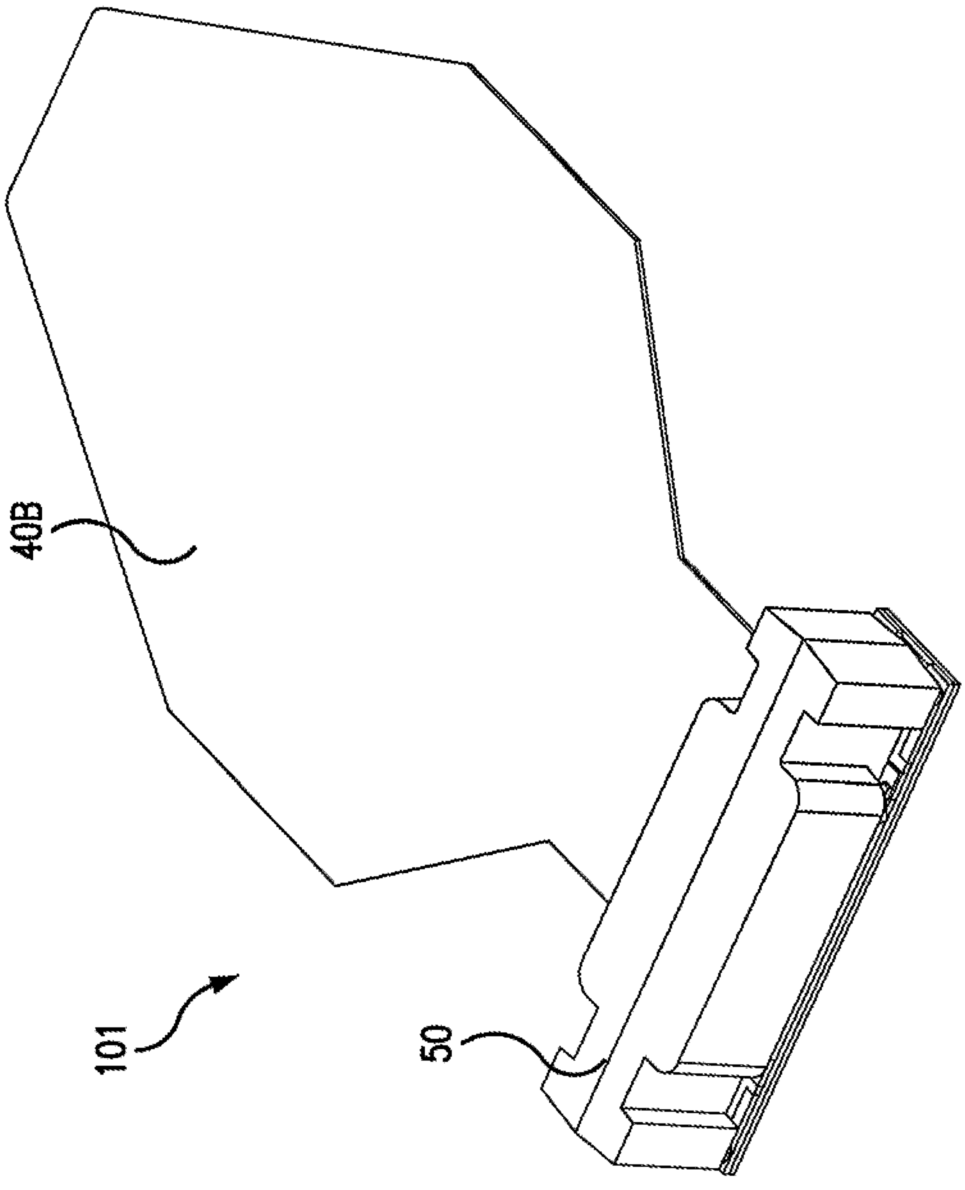
FIG. 5A-5D shows perspective views of a planar high frequency phased ultrasound array in accordance with the disclosed subject matter.
Figure 5B:
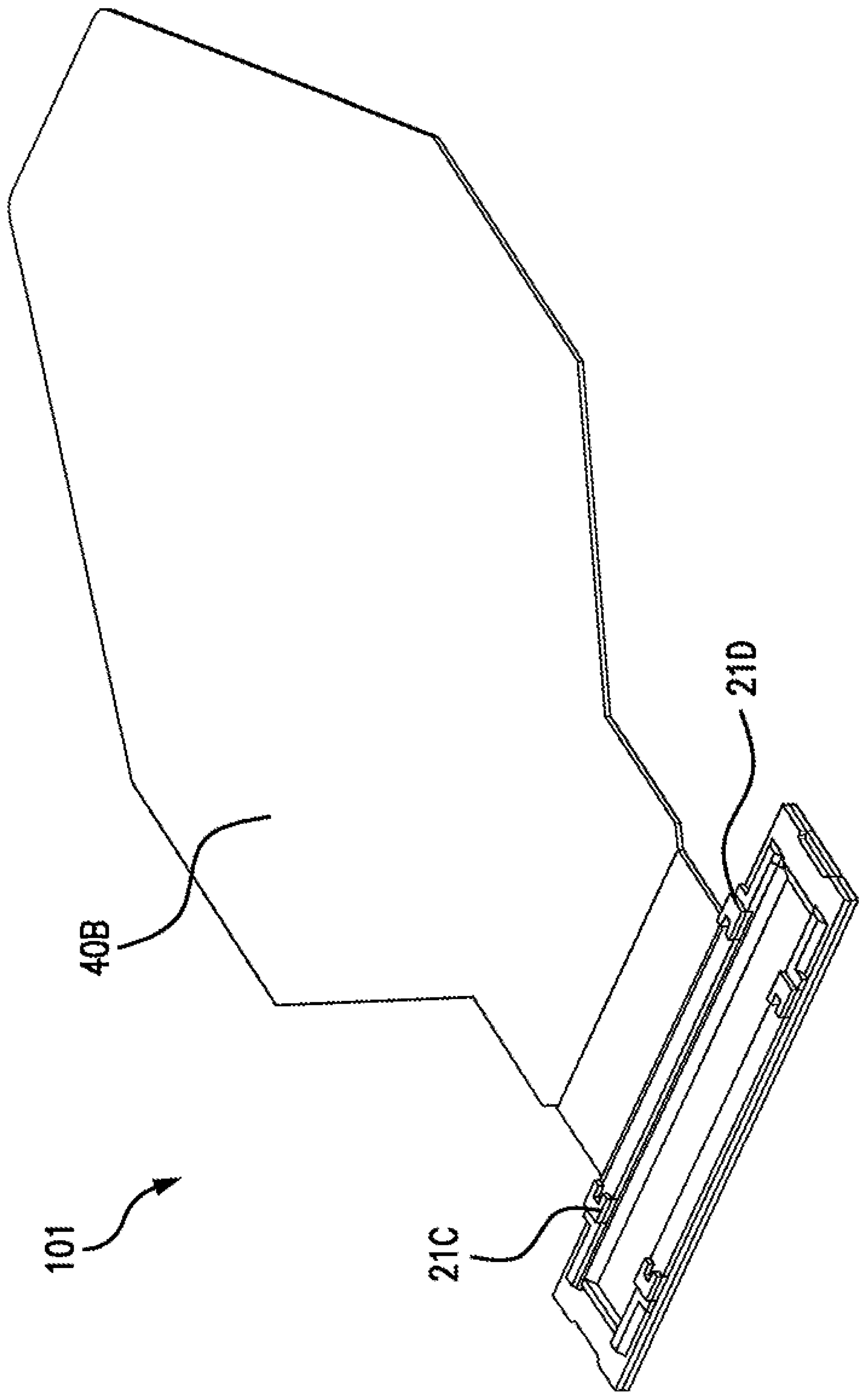
Figure 5C:
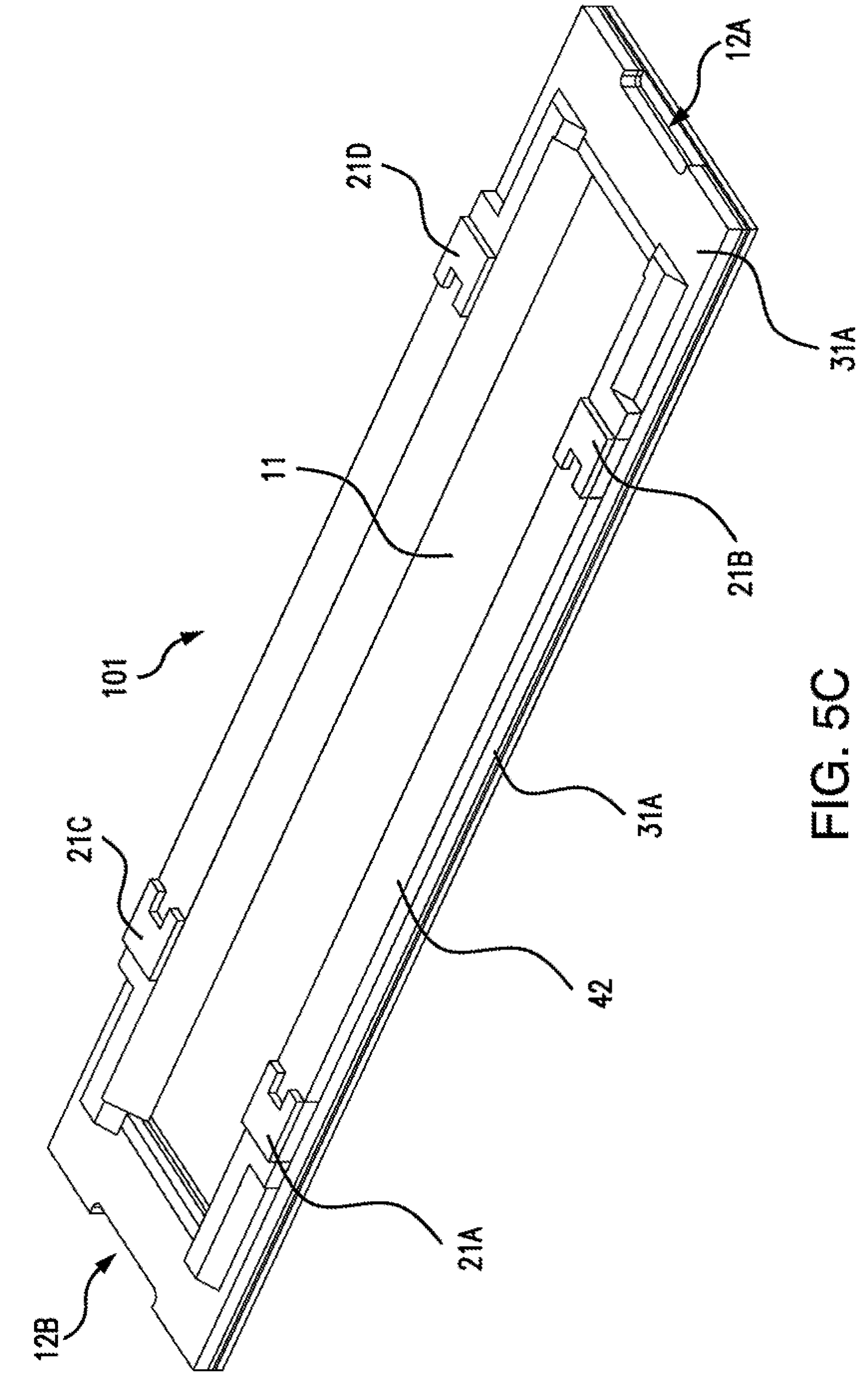
Figure 5D:
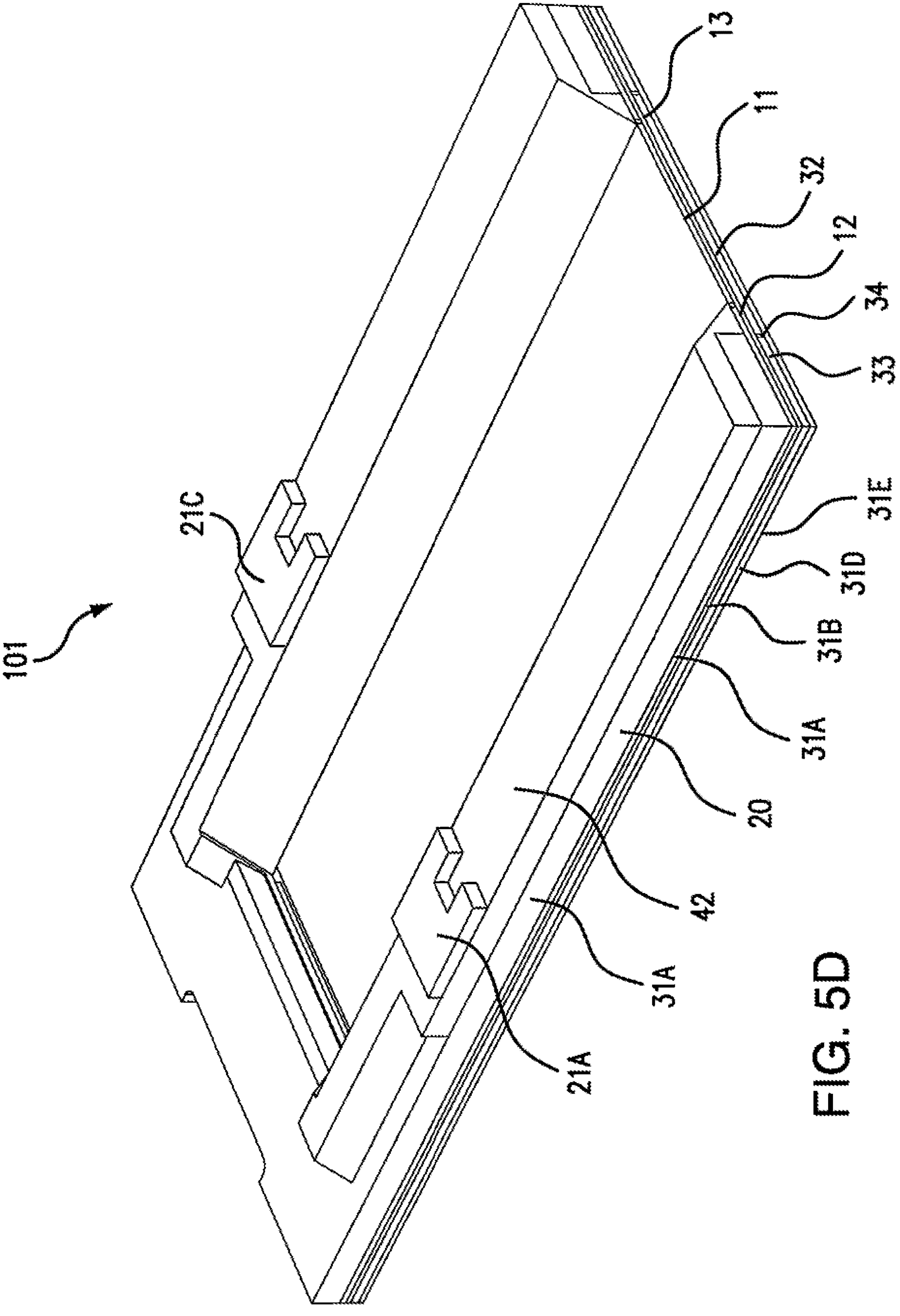

FIGS. 5A-5D show, for purpose of illustration and not limitation, a planar high frequency phased ultrasound array 101 in accordance with the disclosed subject matter, wherein like elements are labeled with the same numbers noted above. In FIG. 5A, the ultrasound array 101 is shown with the backing 50 attached. FIG. 5B shows the ultrasound array 101 with the backing removed for clarity. FIG. 5C shows the flex 40B removed for clarity, and FIG. 5D shows a perspective cut-away for clarity. The array 101 of FIGS. 5A-5D can have any combination of the features described herein above.

The planar high frequency phased ultrasound array of FIGS. 5A-5D includes backing 50 and flexes 41B (40A is not shown for clarity). The array also includes a first layer 10 including a PM 11, piezo frame 12, and epoxy material 13. The piezo frame 12 includes vias 12A, 12B. Matching layers 31A, 31B and lens 32 are coupled to the front side 14 of the first layer 10. Lens 32 is surrounded by a lens frame 33, and lens 32 is attached to frame 33 by adhesive material 34. The lens frame 33 can be made of the same material as the piezo frame, and the adhesive material 34, can be the same as adhesive material 13. Matching layers 31D, 31E are provided on the front side of the lens 32. The flex frame 20 is coupled to the back side 15 of the first layer 10. The flex frame 20 is planar in shape. The array 101 further includes flex overmold 42, and alignment features 21A-21D. Flex 41B is coupled to the pair of alignment features 21C, 21D. Backing 50 is fixed to the flex frame 20.

Although the disclosed embodiments show element spacings that are suitable for a high frequency phased array transducer, it will be appreciated that the structure of the transducer including a piezoelectric sheet, surrounding frame, matching layers and lens could be used for non-phased array transducers or lower frequency transducers. In addition, if used at lower frequencies, then other lens materials such as TPX or Rexolite could be used. Such lens materials may not be kerf cut if the transducer is not designed as a phased array.

From the foregoing, it will be appreciated that specific embodiments of the invention have been described herein for purposes of illustration, but that various modifications may be made without deviating from scope of the invention. For example, the disclosed transducer design can be scaled to operate at lower frequencies (e.g. 2-15 MHz). In addition, aspects of the disclosed technology can be used in more conventional ultrasound transducer designs.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A planar phased ultrasound transducer, comprising:

a first layer including:

a sheet of piezoelectric material (PM), the sheet of PM including one or more kerf cuts, the one or more kerf cuts effective to form two or more transducer elements in the PM;

a piezo frame fully surrounding an outer perimeter of the sheet of piezoelectric material; and an adhesive material placed between the piezo frame and the sheet of piezoelectric material; and a flex frame secured to a back side of the first layer.

2. The ultrasound transducer of claim 1, wherein the one or more kerf cuts extend entirely across a width of the sheet of PM.

3. The ultrasound transducer of claim 1, wherein the two or more transducer elements have a pitch of approximately 40 microns.

4. The ultrasound transducer of claim 1, wherein the PM has a thickness between approximately 70 microns and approximately 80 microns.

5. The ultrasound transducer of claim 1, wherein the two or more transducer elements formed by the kerf cuts each further comprise two or more electrically connected sub-elements formed by one or more sub-dice kerf cuts.

6. The ultrasound transducer of claim 5, wherein a width of the one or more sub-dice kerf cuts is approximately 6 microns.

7. The ultrasound transducer of claim 5, wherein the one or more sub-dice kerf cuts are formed at a midpoint of each of the one or more transducer elements to maintain an aspect ratio between a width and a thickness of the one or more transducer elements.

8. The ultrasound transducer of claim 5, wherein the one or more sub-dice kerf cuts have a depth that is:

approximately equal to a depth of the one or more kerf cuts effective to form the one or more transducer elements, such that the sub-dice kerf cuts extend entirely through a thickness of the PM; or shallower than the depth of the one or more kerf cuts effective to form the one or more transducer elements, such that the sub-dice kerf cuts do not extend entirely through a thickness of the PM.

9. The ultrasound transducer of claim 5, wherein the one or more sub-dice kerf cuts are formed in a pattern comprising:

a quantity of parallel sub-dice kerf cuts that are cut at an acute angle with respect to the kerf cuts that form the two or more transducer elements in the PM, the parallel sub-dice kerf cuts spaced to maintain a width-to-height ratio less than or equal to about 0.6.

10. The ultrasound transducer of claim 5, wherein the one or more sub-dice kerf cuts are formed in a pattern comprising:

alternating sets of parallel cuts, the parallel cuts formed at different angles with respect to the direction of the kerf cuts that form the two or more transducer elements in the PM, the alternating sets of differently angled parallel cuts effective to form a set of alternately oriented, triangular transducer sub-elements each having a base that is aligned with a kerf cut defining the transducer element and a height that is a width of the transducer element.

11. The ultrasound transducer of claim 5, wherein the one or more sub-dice kerf cuts are formed in a pattern comprising:

cuts perpendicular to the kerf cuts that form the two or more transducer elements in the PM, the perpendicular cuts effective to form a set of rectangular sub-elements with a width that corresponds to a distance between the perpendicular cuts and a height that is a width of the transducer element.

12. The ultrasound transducer of claim 5, wherein the one or more sub-dice kerf cuts are formed in a pattern comprising:

alternating sets of differently angled parallel cuts, including a first set of parallel cuts at an acute angle with respect to the kerf cuts that form the two or more transducer elements in the PM and a second set of parallel cuts perpendicular to the kerf cuts that form the two or more transducer elements in the PM, the alternating sets of differently angled parallel cuts effective to form a set of alternating right triangles with hypotenuses facing each other in the two or more transducer elements in the PM.

13. The ultrasound transducer of claim 5, wherein the one or more sub-dice kerf cuts are formed in a pattern comprising:

alternating sets of parallel cuts, the parallel cuts formed at different angles with respect to the direction of the kerf cuts that form the two or more transducer elements in the PM, the alternating sets of differently angled parallel cuts effective to form a set of alternately oriented, equilateral triangular transducer sub-elements each having a base that is aligned with a kerf cut that defines a transducer element in the PM and a height that is a width of the transducer element in the PM.

14. The ultrasound transducer of claim 5, wherein the one or more kerf cuts that form the two or more transducer elements in the PM and the kerf cuts that form the sub-elements are filled with an epoxy material.

15. The ultrasound transducer of claim 1, wherein a width of the one or more kerf cuts in the PM is approximately 6 microns.

16. A planar phased ultrasound transducer, comprising:

a first layer including:

a sheet of piezoelectric material (PM), the sheet of PM including two or more transducer elements formed by at least one kerf cut in the PM;

a piezo frame fully surrounding an outer perimeter of the sheet of piezoelectric material; and an adhesive material placed between the piezo frame and the sheet of piezoelectric material;

a flex frame secured to a back side of the first layer;

a conductive grounding layer secured to a front side of the first layer;

at least one matching layer secured to the conductive grounding layer; and a lens secured to the at least one matching layer.

17. The ultrasound transducer of claim 16, wherein the two or more transducer elements each further comprise two or more electrically connected sub-elements formed by a pattern of sub-dice kerf cuts.

18. The ultrasound transducer of claim 17 wherein:

the matching layer includes matching layer kerf cuts that are aligned with both the at least one kerf cut in the PM and the pattern of sub-dice kerf cuts.

19. The ultrasound transducer of claim 17 wherein:

the lens includes lens kerf cuts that are aligned with the at least one kerf cut in the PM.

20. The ultrasound transducer of claim 17 wherein an epoxy material is used to fill one or more of:

the at least one kerf cut in the PM;

the matching layer kerf cuts;

the lens kerf cuts; or the pattern of sub-dice kerf cuts.

* * * * *